US011834821B1

(12) United States Patent
Graf

(10) Patent No.: US 11,834,821 B1
(45) Date of Patent: *Dec. 5, 2023

(54) WATER QUALITY UNIT FOR FLOW-THROUGH MANHOLE

(71) Applicant: S & M Precast, Inc., Henryville, IN (US)

(72) Inventor: Raymond L. Graf, Henryville, IN (US)

(73) Assignee: S & M Precast, Inc., Henryville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,535

(22) Filed: Nov. 21, 2022

Related U.S. Application Data

(63) Continuation of application No. 17/195,024, filed on Mar. 8, 2021, now Pat. No. 11,505,936, which is a continuation of application No. 16/848,466, filed on Apr. 14, 2020, now Pat. No. 10,941,557.

(51) Int. Cl.
| | |
|---|---|
| *E03F 5/14* | (2006.01) |
| *B01D 21/00* | (2006.01) |
| *E03F 5/02* | (2006.01) |
| *E03F 5/04* | (2006.01) |

(52) U.S. Cl.
CPC ............ *E03F 5/14* (2013.01); *B01D 21/0033* (2013.01); *B01D 21/0042* (2013.01); *B01D 21/0087* (2013.01); *E03F 5/02* (2013.01); *E03F 5/0403* (2013.01)

(58) Field of Classification Search
CPC .. E03F 5/02; E03F 5/0403; E03F 5/14; B01D 21/003; B01D 21/0033; B01D 21/0042; B01D 21/0087; B01D 21/0039

USPC .............. 210/170.03, 521, 532.1, 747.2, 801
See application file for complete search history.

(56) References Cited

U.S. PATENT DOCUMENTS

| | | | | |
|---|---|---|---|---|
| 1,163,189 | A | * | 12/1915 | Wolf .......................... E06B 3/28 49/365 |
| 2,216,300 | A | | 10/1940 | Shenk |
| 2,609,886 | A | * | 9/1952 | Harmon .................. F01N 1/083 181/269 |
| 3,075,336 | A | * | 1/1963 | Hays ..................... F22B 37/265 55/442 |
| 4,983,294 | A | | 1/1991 | Lamb |
| 4,983,295 | A | | 1/1991 | Lamb |
| 5,116,516 | A | | 5/1992 | Smisson |
| 5,753,115 | A | | 5/1998 | Monteith |
| 6,350,374 | B1 | | 2/2002 | Stever |
| 6,428,692 | B2 | | 8/2002 | Happel |
| 6,638,424 | B2 | | 10/2003 | Stever |
| 6,730,222 | B1 | | 5/2004 | Andoh |

(Continued)

FOREIGN PATENT DOCUMENTS

| | | |
|---|---|---|
| EP | 718019 | 6/1996 |
| WO | 2016094299 A1 | 6/2016 |
| WO | 2017182711 A1 | 10/2017 |

*Primary Examiner* — Joseph W Drodge
(74) *Attorney, Agent, or Firm* — Dinsmore & Shohl LLP

(57) ABSTRACT

A drain system for water quality. The drain system may include one or more baffles. The one or more baffles may be arcuate in shape. The one or more baffles may include one or more openings therethrough. The one or more baffles may be offset in elevation. The one or more baffles may include one or more flanges projecting therefrom. The one or more baffles may be implemented in a flow-through manhole application.

23 Claims, 12 Drawing Sheets

(56) References Cited

U.S. PATENT DOCUMENTS

| | | |
|---|---|---|
| 6,913,155 B2 | 7/2005 | Bryant |
| 6,919,033 B2 | 7/2005 | Stark |
| 6,951,619 B2 | 10/2005 | Bryant |
| 7,001,527 B2 | 2/2006 | Stever |
| 7,163,635 B2 | 1/2007 | Fitzgerald |
| 7,182,874 B2 | 2/2007 | Allard |
| 7,238,281 B2 | 7/2007 | Su |
| 7,276,156 B2 | 10/2007 | Lockerman |
| 7,291,262 B2 | 11/2007 | Matsui |
| 7,367,459 B2 | 5/2008 | Batten |
| 7,422,683 B2 | 9/2008 | Park |
| 7,465,391 B2 | 12/2008 | Heist |
| 7,507,333 B2 | 3/2009 | Meyermann |
| 7,527,731 B2 | 5/2009 | Su |
| 7,540,953 B2 | 6/2009 | Fitzgerald |
| 7,540,967 B2 | 6/2009 | Batten |
| 7,638,065 B2 | 12/2009 | Stever |
| 7,641,805 B2 | 1/2010 | Batten |
| 7,699,984 B2 | 4/2010 | Andoh |
| 7,722,763 B2 | 5/2010 | Benty |
| 7,988,870 B2 | 8/2011 | Belasco |
| 8,017,004 B2 | 9/2011 | Crumpler |
| 8,123,935 B2 | 2/2012 | Murray |
| 8,221,618 B2 | 7/2012 | Murray |
| 8,287,726 B2 | 10/2012 | Williams |
| 8,715,507 B2 | 5/2014 | Gulliver |
| 8,746,463 B2 | 6/2014 | Cobb |
| 8,900,448 B2 | 12/2014 | Fink |
| 9,068,337 B2 | 6/2015 | Stein |
| 9,222,248 B2 | 12/2015 | Anderson |
| 9,688,544 B2 | 6/2017 | Fink |
| 9,752,600 B2 | 9/2017 | Hoff |
| 9,827,510 B2 | 11/2017 | Garbon |
| 10,344,466 B2 | 7/2019 | Kent |
| 10,408,242 B1 | 9/2019 | Chamberlain |
| 10,941,557 B1 | 3/2021 | Graf |
| 11,505,936 B1 | 11/2022 | Graf |
| 2004/0069715 A1 | 4/2004 | Stever |
| 2005/0184007 A1 | 8/2005 | Allard |
| 2006/0283814 A1 | 12/2006 | Williamson |
| 2007/0012608 A1 | 1/2007 | Su |
| 2007/0023355 A1 | 2/2007 | Park |
| 2007/0102351 A1 | 5/2007 | Lilley |
| 2007/0108122 A1 | 5/2007 | Andoh |
| 2007/0251879 A1 | 11/2007 | Batten |
| 2007/0267342 A1 | 11/2007 | Cobb |
| 2008/0185325 A1 | 8/2008 | Murray |
| 2008/0203037 A1 | 8/2008 | Batten |
| 2009/0045128 A1 | 2/2009 | Murray |
| 2009/0107910 A1 | 4/2009 | Batten |
| 2012/0255622 A1 | 10/2012 | Braunwarth |
| 2014/0332452 A1 | 11/2014 | Wacome |
| 2015/0176265 A1 | 6/2015 | Crasti |
| 2019/0078311 A1 | 3/2019 | Päivinen |

\* cited by examiner

WATER QUALITY UNIT FOR FLOW-THROUGH MANHOLE

BACKGROUND

The present embodiments relate to water quality control for a flow-through manhole.

Typical drain systems include a manhole having an inlet pipe and an outlet pipe. The fluids moving from the inlet pipe to the outlet pipe carry solids, such as sediment and other items, and drop at least a portion of the solids therein into the cavity of the manhole. The solids or other material collect in the cavity for subsequent removal. This may lead to problems including, but not limited to, a higher flow rate passing through the manhole and interrupting the collected solids thereby resuspending the solids and inadvertently washing such material downstream. Thus, there is a need to increase removal efficiency and/or reduce resuspending of the collected solids.

SUMMARY

In some embodiments of the invention, for example, a drain system having a flow direction comprising a manhole, a first arcuate baffle, and/or a second arcuate baffle. In various embodiments, the manhole may include at least one inlet and at least one outlet positioned downstream from at least one inlet. In some embodiments, the first arcuate baffle may have an upper edge and a lower edge and opposing side walls interconnecting the upper edge and the lower edge, and a convex side upstream of a concave side. In addition, in some embodiments, the second arcuate baffle may be spaced downstream of the first arcuate baffle, wherein the second arcuate baffle may include an upper edge and a lower edge and opposing side walls interconnecting the upper edge and the lower edge, and a concave side upstream of a convex side. Moreover, in various embodiments, the first arcuate baffle and the second arcuate baffle each may include a plurality of openings extending through both the concave side and convex side, respectively.

In some embodiments, the upper edge of the second arcuate baffle may be at an elevation above the upper edge of the first arcuate baffle. In various embodiments, the lower edge of the second arcuate baffle may be at an elevation between the upper edge of the first arcuate baffle and the lower edge of the first arcuate baffle. In some embodiments, the upper edge of the first arcuate baffle may include a first flange extending downstream and the lower edge of the first arcuate baffle may include a second flange extending upstream. In various embodiments, the upper edge of the second arcuate baffle may include a first flange extending upstream and the lower edge of the second arcuate baffle may include a second flange extending downstream. Moreover, in some embodiments, the plurality of openings of the second arcuate baffle may include an arcuate pattern. In various embodiments, the side walls of each one of the first arcuate baffle and the second arcuate baffle may be attached to a side wall of the manhole. In some embodiments, the lower edge of each one of the first arcuate baffle and the second arcuate baffle may be spaced away from a bottom wall of the manhole, and the upper edge of each of the first arcuate baffle and the second arcuate baffle are spaced from a top wall of the manhole. In addition, in various embodiments, the lower edge of each one of the first arcuate baffle and the second arcuate baffle may be adjacent a bottom wall of the manhole, and the upper edge of each of the first arcuate baffle and the second arcuate baffle are spaced from a top wall of the manhole. In some embodiments, the plurality of openings may be positioned away from each other adjacent the opposing side walls of each of the first arcuate baffle and the second arcuate baffle, respectively.

In various embodiments, a drain system having a flow direction may comprise a manhole, a first arcuate baffle, and/or a second arcuate baffle. In some embodiments, the manhole may include at least one inlet and at least one outlet positioned downstream from the at least one inlet. In various embodiments, the first arcuate baffle may have an upper edge and a lower edge and opposing side walls interconnecting the upper edge and the lower edge, and a convex side upstream of a concave side. In some embodiments, the second arcuate baffle may be spaced downstream of the first arcuate baffle, wherein the second arcuate baffle may include an upper edge and a lower edge and opposing side walls interconnecting the upper edge and the lower edge, and a concave side upstream of a convex side. Moreover, in some embodiments, the upper edge of the second arcuate baffle may be at a first elevation above the upper edge of the first arcuate baffle and the lower edge of the second arcuate baffle may be at a second elevation between the upper edge of the first arcuate baffle and the lower edge of the first arcuate baffle.

In addition, in some embodiments, the upper edge of the first arcuate baffle may include a first flange extending downstream and the lower edge of the first arcuate baffle may include a second flange extending upstream, and the upper edge of the second arcuate baffle may include a first flange extending upstream and the lower edge of the second arcuate baffle may include a second flange extending downstream. In various embodiments, the first arcuate baffle may include a plurality of first openings adjacent the upper edge and the second arcuate baffle includes a plurality of second openings adjacent the lower edge. In some embodiments, the plurality of second openings of the second arcuate baffle may be positioned in an arcuate pattern. In various embodiments, the plurality of first openings of the first arcuate baffle may be positioned in a linear pattern substantially parallel to the upper edge. In some embodiments, the lower edge of each one of the first arcuate baffle and the second arcuate baffle may be spaced away from a bottom wall of the manhole, and the upper edge of each of the first arcuate baffle and the second arcuate baffle may be spaced from a top wall of the manhole. In some embodiments, the lower edge of each one of the first arcuate baffle and the second arcuate baffle may be adjacent a bottom wall of the manhole, and the upper edge of each of the first arcuate baffle and the second arcuate baffle may be spaced from a top wall of the manhole. In various embodiments, the first arcuate baffle may include at least two opposing first openings adjacent the upper edge and spaced apart at the opposing side walls, and the second arcuate baffle includes at least two opposing second openings adjacent the lower edge and spaced apart at the opposing side walls.

In some embodiments, a drain system having a flow direction may comprise a first arcuate baffle and/or a second arcuate baffle. In various embodiments, the first arcuate baffle may have a concave side and an opposing convex side. In some embodiments, a second arcuate baffle spaced downstream of the first arcuate baffle, wherein the second arcuate baffle may include a concave side and an opposing convex side. Moreover, in some embodiments, the concave sides of each of the first arcuate baffle and the second arcuate baffle may face towards each other to define a cavity therebetween.

In addition, in some embodiments, each of the first arcuate baffle and the second arcuate baffle may include an upper edge and a lower edge, and opposing side walls interconnecting the upper edge and the lower edge. In various embodiments, each of the first arcuate baffle and the second arcuate baffle may include a first flange extending from the upper edge into the cavity therebetween. In some embodiments, the first arcuate baffle and the second arcuate baffle may include a second flange extending from the lower edge in opposite directions away from the cavity. Moreover, in various embodiments, each of the first arcuate baffle and the second arcuate baffle may include a second flange extending from the lower edge in opposite directions away from the cavity. In some embodiments, each of the first arcuate baffle and the second arcuate baffle may include a plurality of openings extending between the concave side and the convex side. In some embodiments, the plurality of openings of the first arcuate baffle may be substantially in the same horizontal plane, and wherein the plurality of openings of the second arcuate baffle may be in an arcuate pattern in a direction between the lower edge and the upper edge. In various embodiments, the arcuate pattern of the plurality of openings of the second arcuate baffle may increase in elevation from the lower edge towards each of the opposing side walls. In some embodiments, the lower edge of each one of the first arcuate baffle and the second arcuate baffle may be adjacent a bottom wall of a manhole, and the upper edge of each of the first arcuate baffle and the second arcuate baffle may be spaced from a top wall of the manhole. Moreover, in various embodiments, the first arcuate baffle may include at least two opposing first openings adjacent the upper edge and spaced apart at the opposing side walls, and the second arcuate baffle may include at least two opposing second openings adjacent the lower edge and spaced apart at the opposing side walls. In addition, in some embodiments, the drain system may include a manhole having at least one inlet and at least one outlet positioned downstream from at least one inlet, wherein the first arcuate baffle and the second arcuate baffle may be positioned between at least one inlet and at least one outlet.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Numerous variations and modifications will be apparent to one of ordinary skill in the art, as will become apparent from the description below. Therefore, the invention is not limited to the specific implementations discussed herein.

Figure 7:
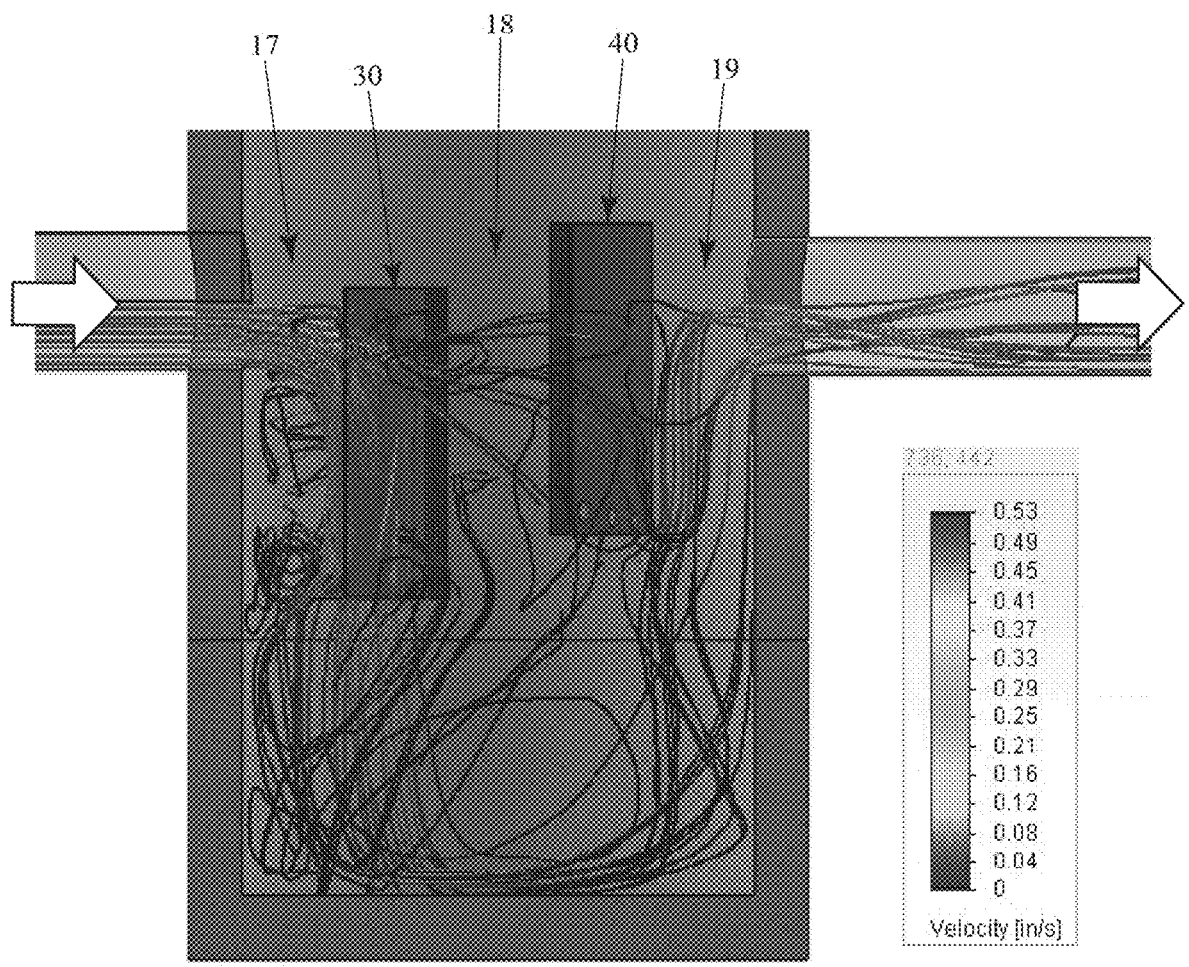
FIG. 7 is a chart illustrating flow velocity/paths through the drain system embodiment of FIG. 1.
Figure 12:
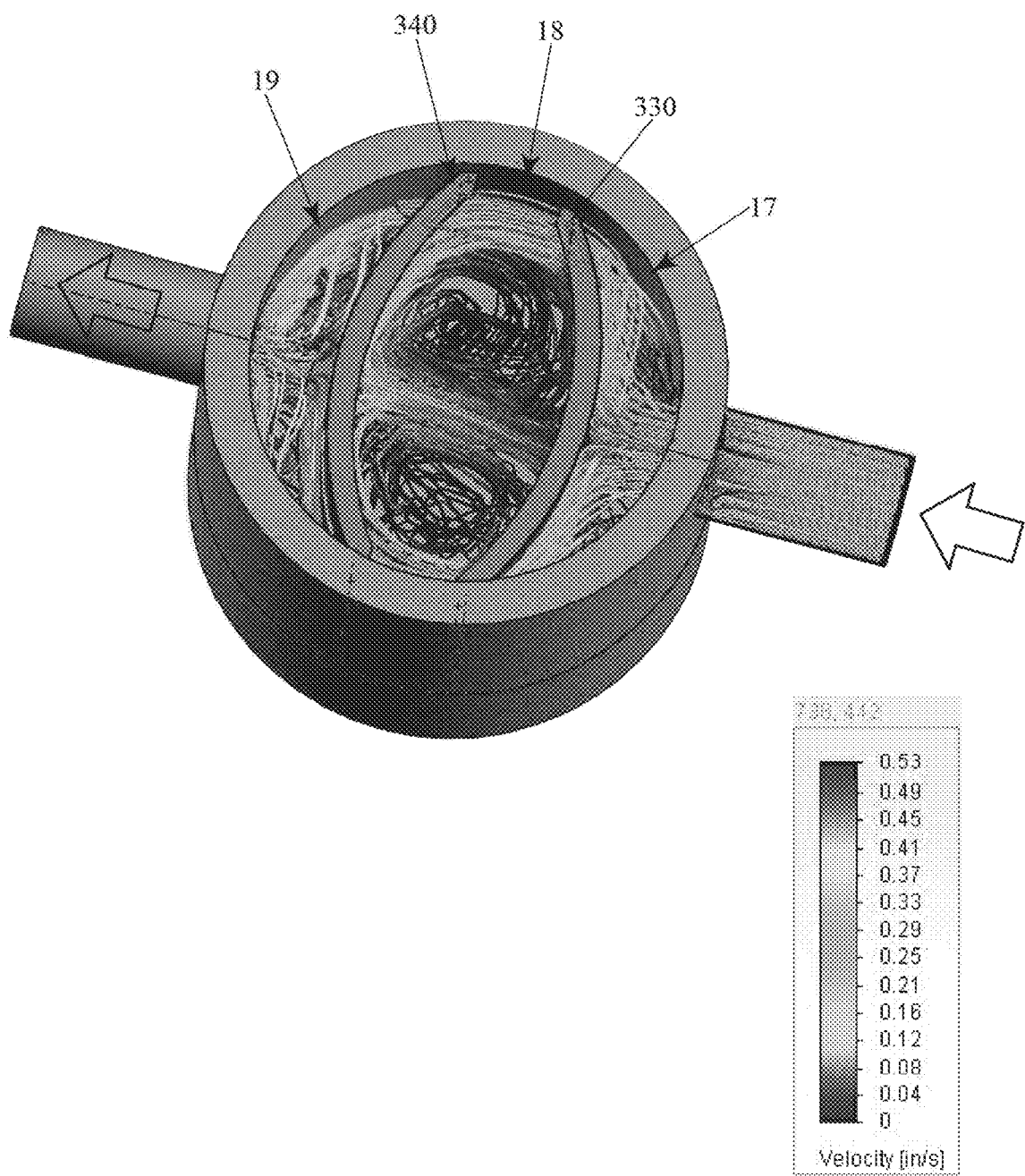
FIG. 12 is a chart illustrating flow velocity/paths through the drain system embodiment of FIG. 11.

The embodiments discussed hereinafter will focus on the implementation of the hereinafter-described techniques within a manhole 10 commonly used in sewer/drain systems 1 to temporarily collect settable solids until removal from the system. As shown in the Figures, a typical manhole 10 includes a cylindrical side wall 11 and a bottom wall 12 and opposing top wall or cover 13. The top wall 13 may include an access port/lid 14 for access to remove the collected settable solids. One or more inlets or inlet pipes 15 may extend into the manhole side wall 11 and be in fluid communication with one or more downstream outlets or outlet pipes 16 extending out of the manhole 10. Both the inlet 15 and outlet 16 of the one embodiment shown, are positioned above or spaced upwardly from the bottom wall 12. In the drain system 1, including a typical manhole 10, fluids flow into the manhole through the inlet 15 and exits out of the manhole through the outlet 16 as shown. One or more baffles 20 within the manhole 10 may increase the removal of solids, efficiency, decrease flow energy, reduce resuspension, vary the fluid velocity/paths of the flow-through fluid (as shown in FIGS. 7 and 12), and/or the like for water quality. The one or more baffles 20 in the one embodiment shown may be installed before installation of the manhole 10 or after installation of the manhole 10 in its application. The one or more baffles 20 may be attached to the interior of the side wall 11 through one or more access openings (e.g. manhole without top wall 13, opened lid 14, and/or top wall 13). One or more fasteners (e.g. bolts, screws, locating pins, etc.) may fix the one or more baffles within the manhole 10. It should be understood that the drain system 1 or manhole 10 may be a variety of sizes, shapes, quantities, and constructions and still be within the scope of the invention. For example, although the inlet pipe 15 and the outlet pipe 16 is shown to have substantially the same elevation, diameter, and may be coaxial to each other in the one embodiment, it should be understood that a variety of elevations, diameters, and/or relative orientations/positions between the one or more inlets/outlets may be constructed (e.g. different axis/elevations).

In some implementations, one or more baffles 20 may be used within the drain system 1. The one or more baffles 20 may include a plurality of baffles positioned within the fluid flow (e.g. in series, parallel, both, etc.). In the one embodiment shown, an upstream baffle 30 and a downstream baffle 40 may be used. The upstream baffle 30 and the downstream baffle 40 may be positioned between or in fluid communication with the inlet 15 and the outlet 16 of the manhole 10. The upstream baffle 30 may be spaced away from the downstream baffle 40 (e.g. in the horizontal plane). The baffles 20 may be offset in elevation relative to each other. In the one embodiment shown, the downstream baffle 40 may be upwardly offset (e.g. vertically) from the upstream baffle 30. The one or more baffles 20 may include a plurality of edges or peripheries (e.g. inner and/or outer peripheries) directing fluid between the inlet 15 and the outlet 16. For example, in the one embodiment shown, one or more of the baffles 20 may include an upper edge 21 and a lower edge 22 with opposing side walls 23. The side walls 23 may interconnect the upper edge 21 and the lower edge 22. The upper and lower edges 21, 22 may be alternatively described as free ends of the baffle such that the contents/fluid may flow about these edges/structure (e.g. above and/or below) between cavities of drain system 1. The upper edge 21 may be spaced downwardly and away from the top wall 13. The lower edge 22 may be spaced upwardly and away from the bottom wall 12. The side walls 23 of the baffle 20 may be attached to or be adjacent the side wall 11 of the manhole 10. Each baffle 20 may include an upstream side 24 and a downstream side 25. The upstream side 24 may face towards the upstream fluid communication into the manhole 10 or inlet 15. The downstream side 25 may face towards the downstream fluid communication out of the manhole 10 or outlet 16. The upstream side 24 and/or downstream side 25 may be defined by upper/lower edges 21, 22, side walls 23 and/or other portions of the baffle (e.g. openings therethrough). The upstream baffle 30 and downstream baffle 40 may define one or more cavities in the direction between the inlet 15 and the outlet 16. A first cavity 17 may be at least partially defined between the inlet 15, cylindrical side wall 11, and/or the upstream baffle 30 (e.g. upstream side 24). A second cavity 18 may be at least partially defined between the upstream baffle 30 (e.g. downstream side 25), cylindrical side wall 11, and/or the downstream baffle 40 (e.g. upstream side 24). Moreover, a third cavity 19 may be at least partially defined between the downstream baffle 40 (e.g. downstream side 25), cylindrical side wall 11, and/or the outlet 16. The first cavity 17 and the third cavity 19 may be similarly shaped in cross section. However, as shown in the one embodiment, the cavities may be different. The second cavity 18 may be larger in cross section than the first cavity 17 and/or the third cavity 19. The baffle 20 may be a variety of sizes, shapes, quantities, constructions, positions within the manhole and still be within the scope of the invention. For example, the cavities defined by the one or more baffles may be a variety of shapes, sizes, quantities, and construction.

In some implementations, the one or more of the baffles may be arcuate in shape. The upstream baffle 30 and/or downstream baffle 40 may be arcuate in shape. As shown in the one embodiment, each one of the upstream and downstream baffles 30,40 may be arcuate. The upstream/downstream arcuate baffles 30/40 may include an arcuate upper edge, lower edge, upstream side, and/or downstream side. In the one embodiment shown in FIGS. 1-5, the upstream arcuate baffle 30 may include the upstream side 24 being convex in shape and the downstream side 25 being concave in shape. The upstream arcuate baffle 30 includes the convex side upstream of the opposing concave side. In the one embodiment shown in FIGS. 1-4, and 6, the downstream arcuate baffle 40 may include the upstream side 24 being concave and the downstream side 25 being convex. Moreover, the downstream arcuate baffle 40 includes the concave side upstream of the opposing convex side. Alternatively described, the concave sides of the upstream and downstream baffles 30, 40 face towards each other when assembled with the manhole to define at least a portion of the second cavity 18. The opposing sides or convex sides of the upstream arcuate baffle 30 and the downstream arcuate baffle 40 face in the opposing directions (e.g. towards the inlet and outlet, respectively). The convex or upstream side 24 of the upstream arcuate baffle 30 may define at least a portion of the first cavity, adjacent the inlet 15. The convex or downstream side 25 of the downstream arcuate baffle 40 may define at least a portion of the third cavity 19, adjacent the outlet 16. In the one embodiment shown, the cavities may be described as a crescent shaped first cavity 17 and third cavity 19 (e.g. opposite/different orientation) and/or an ellipse shape (e.g. elliptical and/or oval) for the second cavity 18. Alternatively, in some embodiments, the cavities/baffles may not be continuously curved but may include one or more angles defined by the baffles.

In some implementations, the baffles 20 may include one or more flanges. In various embodiments, the baffle 20 may include one or more flanges, if used, extending upstream/downstream therefrom. The baffle may include a top or first flange 26 extending from adjacent the upper edge 21 of the baffle 20. The baffle 20 may include a bottom or second flange 27 extending from adjacent the lower edge 22 of the baffle 20. In the one embodiment shown, the baffle 20 include both the first and second flanges 26, 27. The first flange 26 of the upstream baffle 30 may extend downstream from adjacent the upper edge 21 and/or the second flange 27 may extend upstream from adjacent the lower edge 22. The first flange 26 of the downstream baffle 40 may extend upstream from adjacent the upper edge 21 and/or the second flange 27 may extend downstream from adjacent the lower edge 22. In the one embodiment shown, the top or first flanges 26 of each baffle 30, 40 may extend (e.g. upstream and downstream, respectively) into the second cavity 18. Moreover, the bottom or second flange 27 of the upstream baffle 30 may extend upstream into the first cavity 17. In addition, as shown in the one embodiment, the bottom or second flange 27 of the downstream baffle 40 may extend downstream into the third cavity 19. Alternatively stated, the second flanges 27 of the upstream and downstream baffles 30, 40 extend in opposite directions (e.g. upstream and downstream) of or away from the second cavity 18. In some embodiments, one or more of the flanges 26, 27 may extend in a horizontal plane from baffle 20. The one or more flanges 26, 27 may be arcuate in shape. In some embodiments, the one or more flanges may extend in the vertical plane. In the one embodiment as shown, the flange 28 may extend from/along the side walls 23 of the baffle 20. Moreover, in the one embodiment shown, one or more flanges 28 may extend along or adjacent the side wall 23 of the baffle 20 between upper edge 21 and lower edge 22. The one or more flanges 28, or portions thereof (e.g. apertures), may receive the one or more fasteners (not shown) to engage the baffle 20 to the side wall 11 of the manhole 10. It should be understood that the flange of the baffle may be a variety of shapes, sizes, quantities, constructions, positions, and orientations and still be within the scope of the invention.

Figure 6:
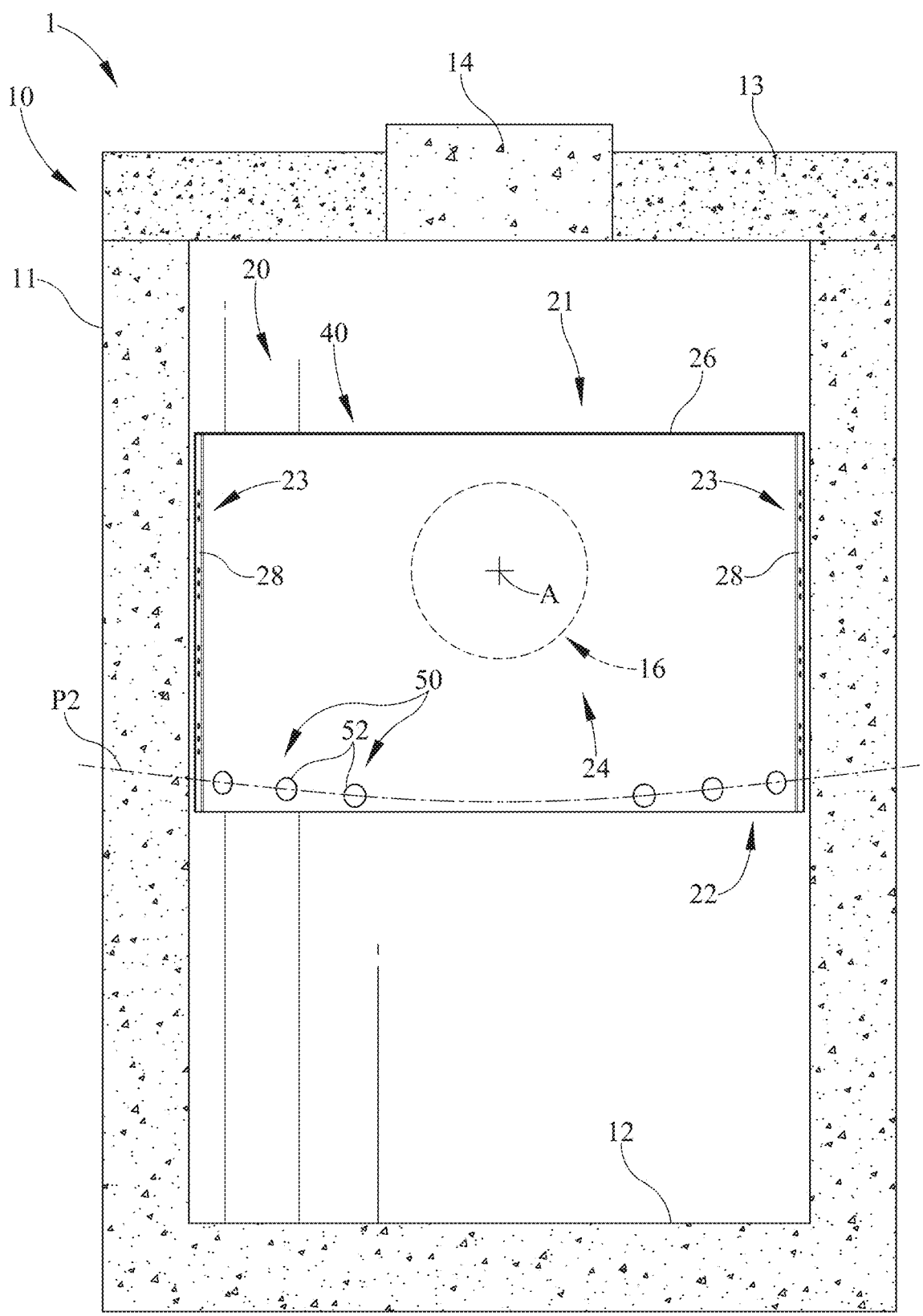
FIG. 6 is a sectional view of drain system taken along line 6-6 of FIG. 2.

In various implementations, the one or more baffles 20 may include one or more openings 50 therethrough. The opening 50, if used, may extend in the direction of flow from inlet 15 towards the outlet 16 or through the baffle 20 (e.g. through both the upstream side 24 and the downstream side 25 of the baffle). Flow may pass through one or more of the openings 50, if used, and/or bypass the upper edge 21 and/or lower edge 22 of the corresponding one or more baffles 20, 30, 40. Each one of the upstream baffle 30 and the downstream baffle 40 may include a plurality of openings 50. Alternatively, a single upstream baffle 30 or downstream baffle 40 may include the one or more openings 50. The opening 50 or periphery defining the opening 50 may be substantially circular in some embodiments. The outer periphery of the opening 50 may be continuous about the opening as shown in the one embodiment, or may be discontinuous (e.g. intersecting an edge of the baffle 20, defined in part by the side wall 11 of the manhole, etc.). In the one embodiment shown, the first openings 51, if used, of the upstream baffle 30 may be positioned adjacent the upper edge 21. The first openings 51 may be positioned in a linear pattern P1 in a horizontal plane along the upstream arcuate baffle. The linear pattern P1 may be parallel to and/or spaced away from the upper edge 21. The first openings 51 may be positioned along the arcuate shape of the upstream arcuate baffle 30. In the one embodiment shown, the second openings 52, if used, of the downstream baffle 40 may be positioned adjacent the lower edge 22. The second openings 52 may be positioned in a plurality of different vertical elevations within the baffle. As best shown in FIG. 6, the second openings 52 may be positioned in an arcuate pattern P2 (e.g. at one or more radiuses) about an axis (e.g. along a longitudinal axis in the direction of flow, longitudinal axis A of the outlet 16, etc.) or in a direction between the lower edge 22 and the upper edge 21 of the baffle 20. The arcuate pattern P2 may also be described as being substantially perpendicular to the arcuate shape of the baffle. The position of the second openings 52 may increase in elevation from the lower edge 22 (e.g. adjacent the midpoint of the baffle) towards each one of the opposing side walls 23. The second openings 52 may not extend continuously along the pattern P2 or arc, as shown in FIG. 6. The second openings 52 may not present adjacent the midpoint of the baffle but are positioned laterally therefrom towards the side wall 23, 11 in a progressively increasing elevation along the arc or pattern P2. The second openings 52 may be positioned along the arcuate shape of the downstream arcuate baffle 40. It should be understood that the openings 50 may be a variety of quantities, shapes, sizes, constructions, and positions within the one or more baffles 20 and still be within the scope of the invention. For example, although the opening 50 (e.g. 51 and/or 52) may not each have an axis parallel to another opening 50 (e.g. 51 and/or 52) within one or more arcuate baffles as shown, one or more openings may have an axis parallel to each other in some embodiments.

Figure 1:
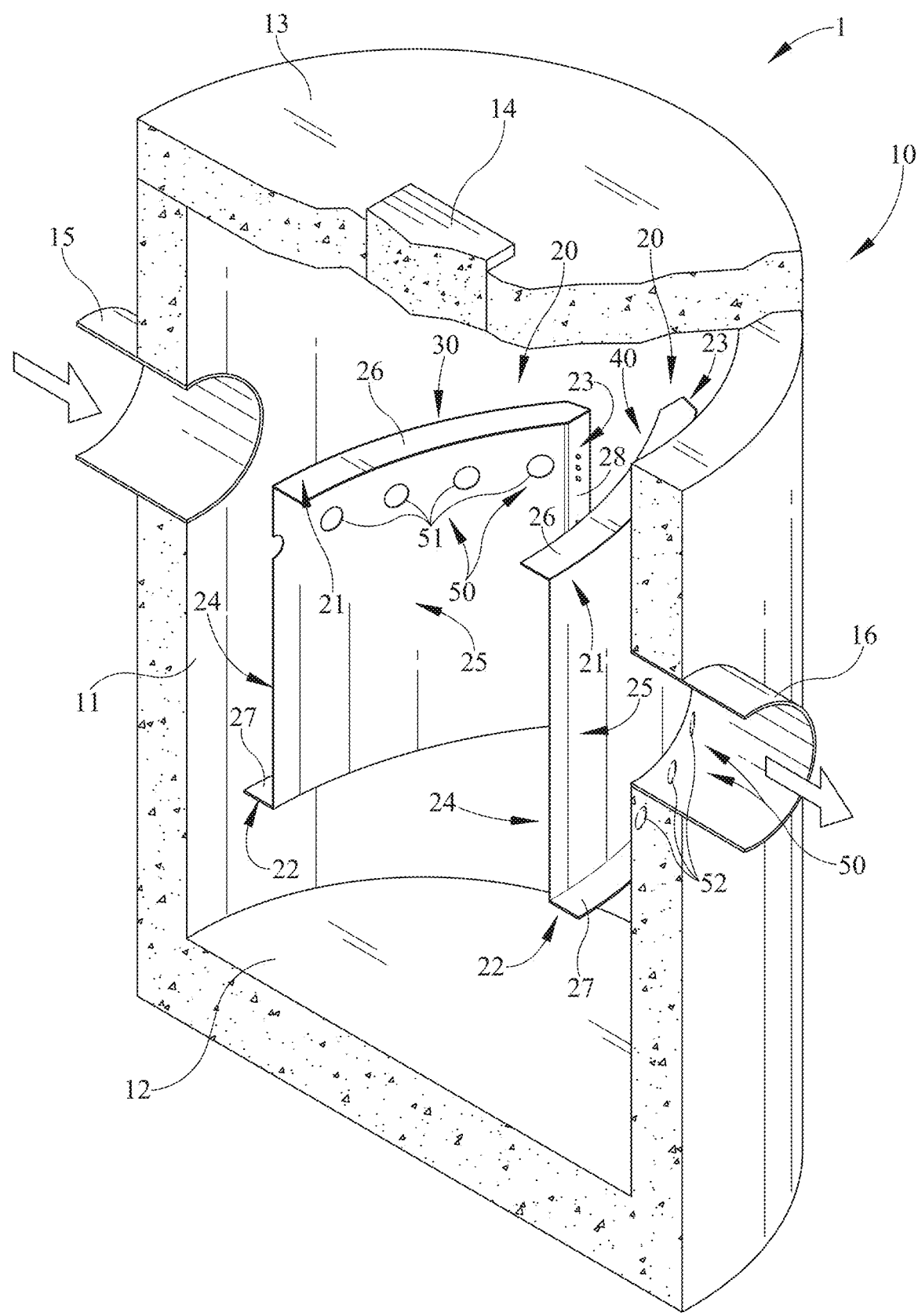
FIG. 1 is a perspective, sectional view of an embodiment of a drain system.
Figure 2:
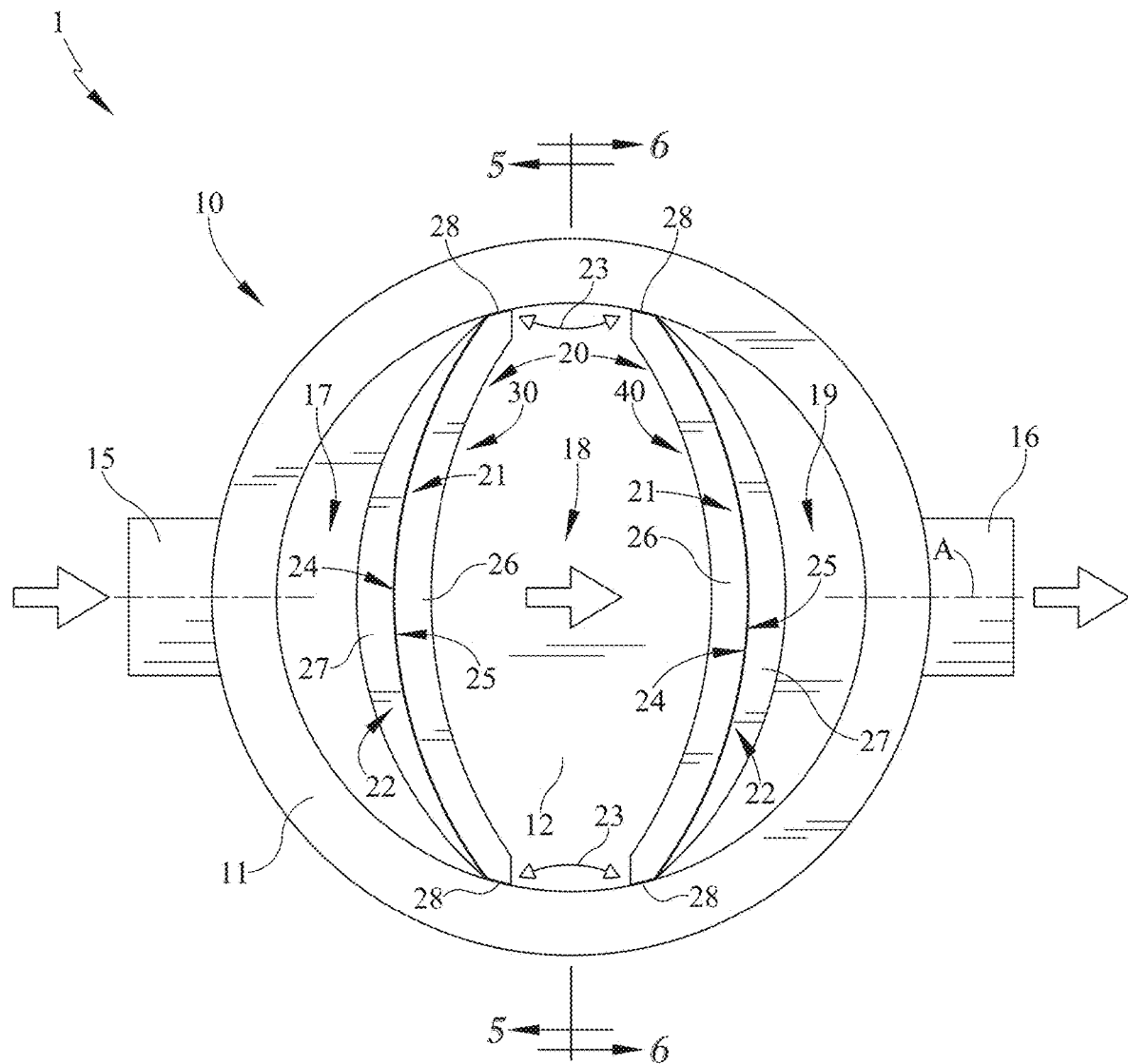
FIG. 2 is top view of the drain system of FIG. 1, with the top wall of the manhole removed.
Figure 3:
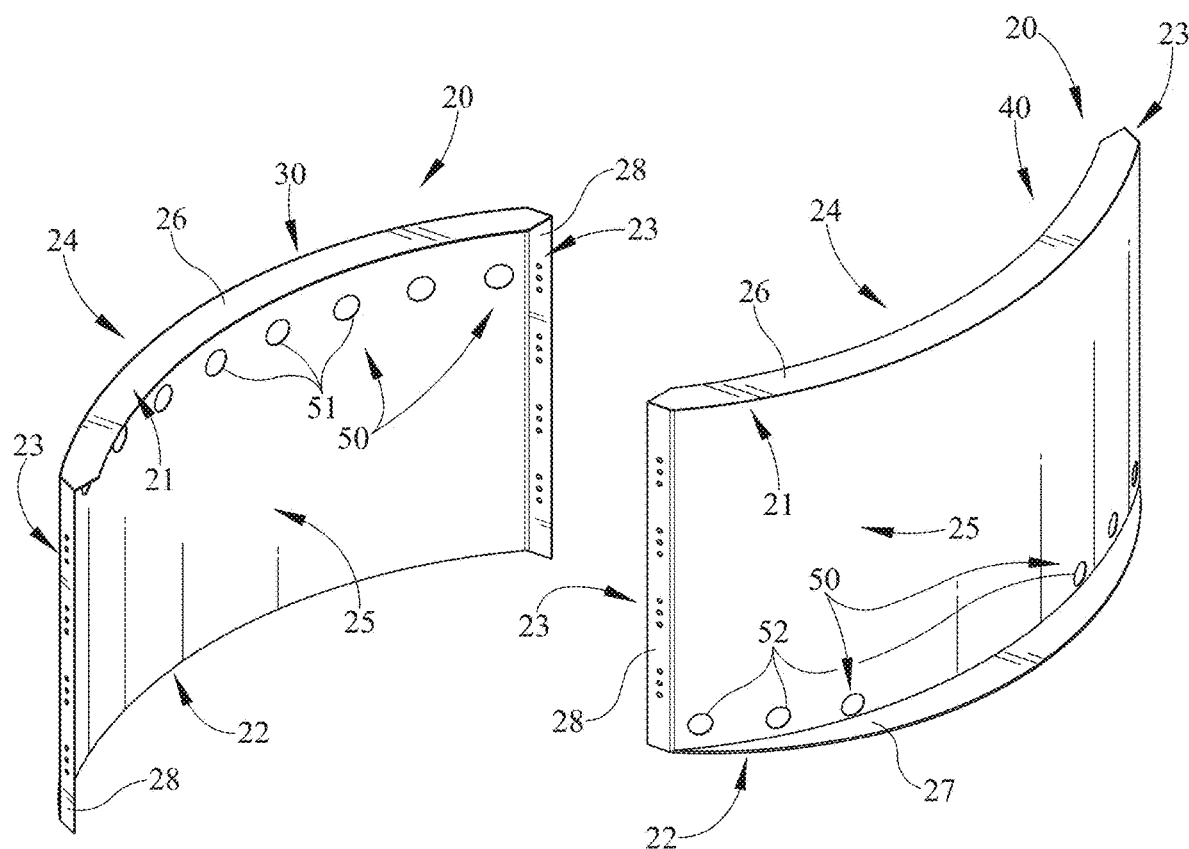
FIG. 3 is a perspective view of the embodiment of the upstream baffle and downstream baffle of FIG. 1.
Figure 4:
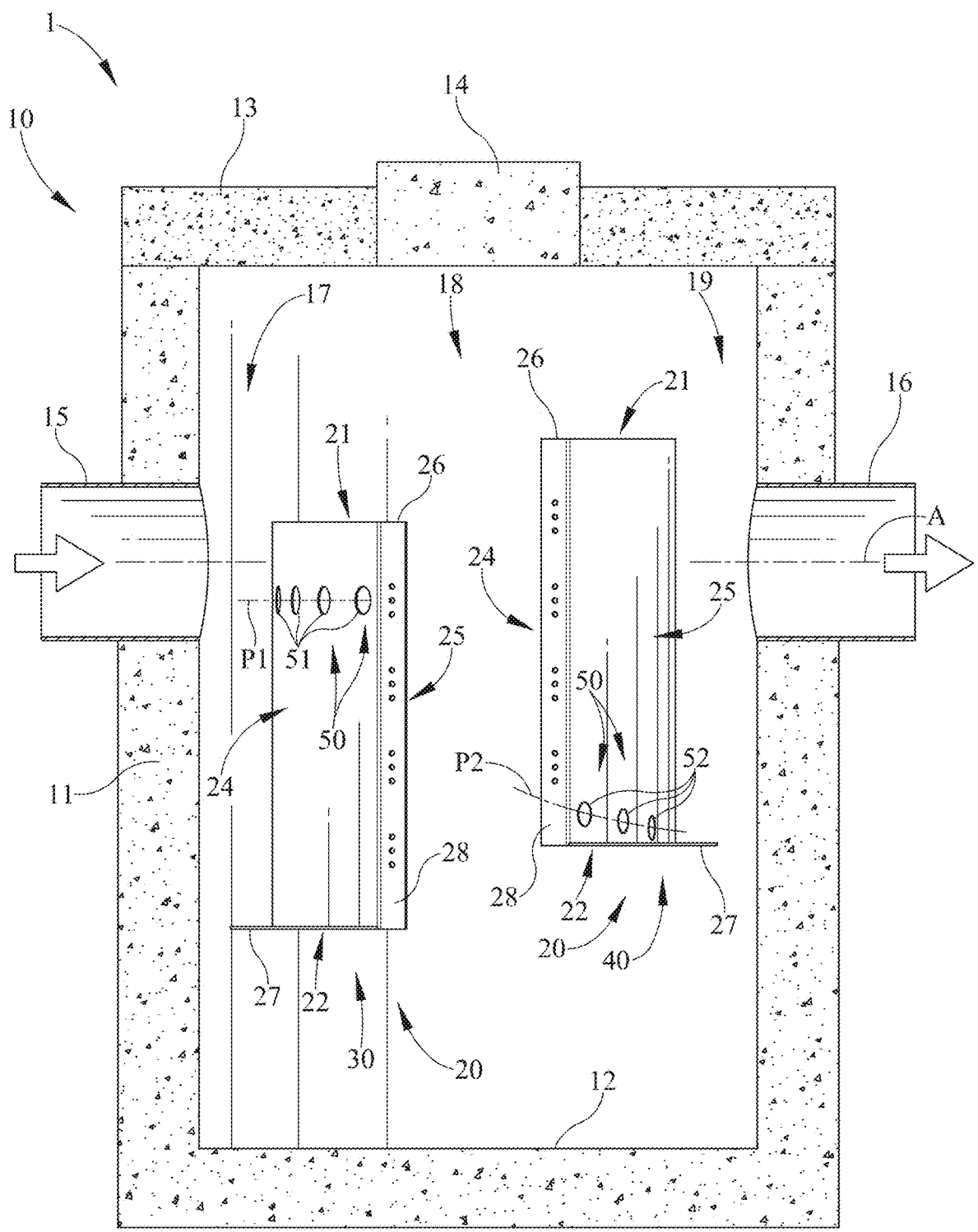
FIG. 4 is a side view of the embodiment of the upstream baffle and the downstream baffle of FIG. 1 illustrating their elevation within the sectional view of the manhole of FIG. 1.
Figure 5:
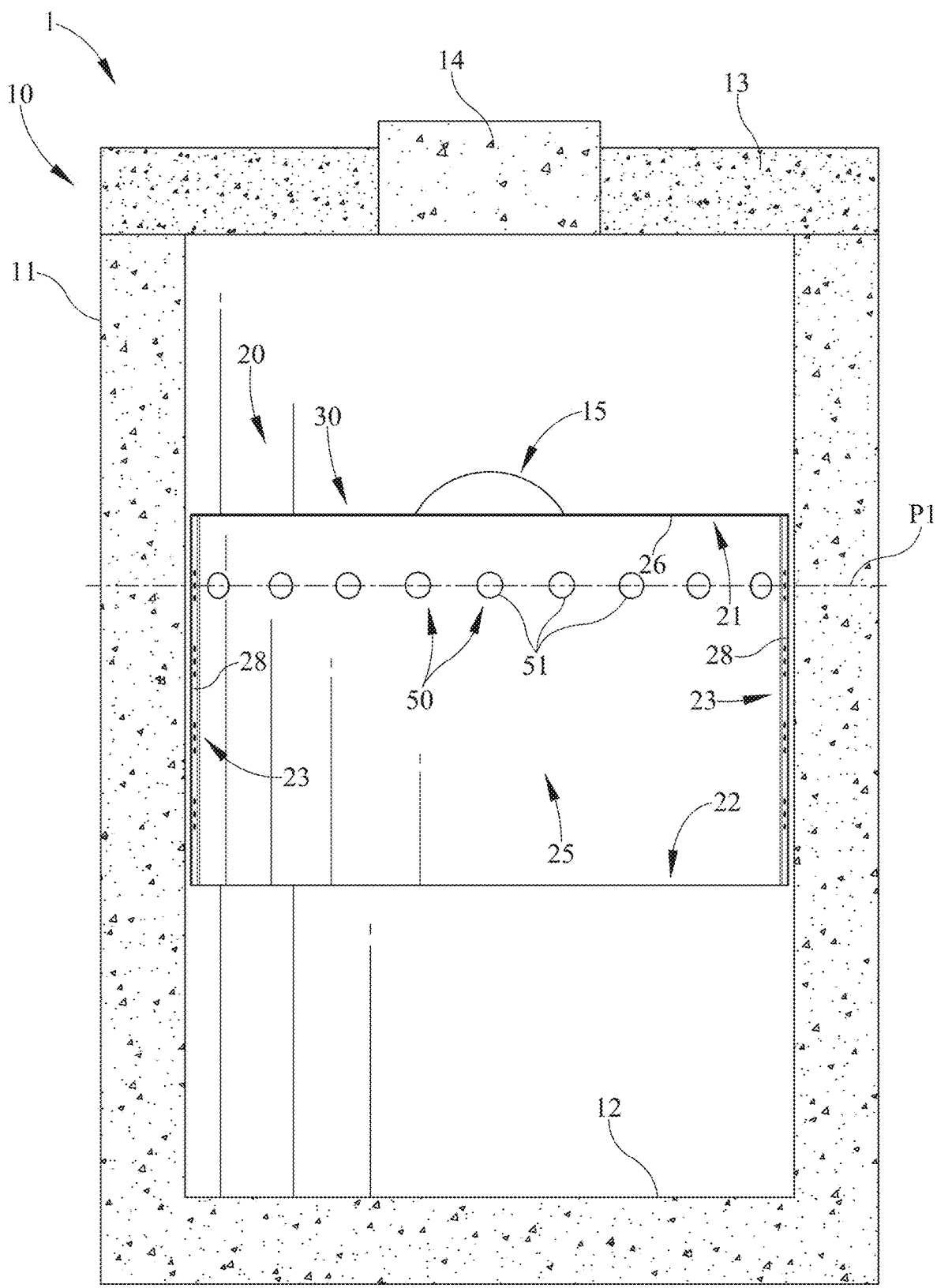
FIG. 5 is a sectional view of drain system taken along line 5-5 of FIG. 2.

In some implementations, the baffles 20 may be positioned between the inlet 15 and outlet 16 of the manhole 10 in a variety of positions (e.g. elevations, spacing, etc.) relative to each other. As shown in the one embodiment, the baffles 20 or portions thereof may be offset from each other in elevation. As shown in FIG. 4, the second or downstream arcuate baffle 40 may be offset upwardly above the first or upstream arcuate baffle 30. The upper edge 21 and/or first flange 26 of the downstream arcuate baffle 40 may be at an elevation above or offset from the upper edge 21 and/or first flange 26 of the upstream arcuate baffle 30. In various embodiments, the lower edge 22 of the second or downstream arcuate baffle 40 may be offset from or at an elevation between the upper edge 21 of the first arcuate baffle 30 and the lower edge 22 of the first arcuate baffle 30. The upper edge 21, first flange 26, and/or the first openings 51 of the first or upstream arcuate baffle 30 may be positioned between the top extent and bottom extent of the inlet pipe 15. Also, in the one embodiment shown, the upper edge 21 and/or first flange 26 of the second arcuate baffle 40 may be positioned above the top extent of the outlet pipe 16. It should be understood that the baffles 20 may be in a variety of positions relative to the inlet/outlet within the side wall 11 of the manhole 10.

In use, the baffles 20 (e.g. one or more of the upstream arcuate baffles and/or one or more of the downstream arcuate baffles) may be stacked together for shipping, storage, or handling. Being stacked, the one or more baffles 20 may be easily handled and/or packaged together. It should be understood that any combination of upstream arcuate baffles 30 and/or downstream arcuate baffles 40 may be stacked with concave side of one baffle 20 receiving the convex side of another baffle 20. When stacked the flanges, if any, of adjacent baffles may overlap.

Figure 8:
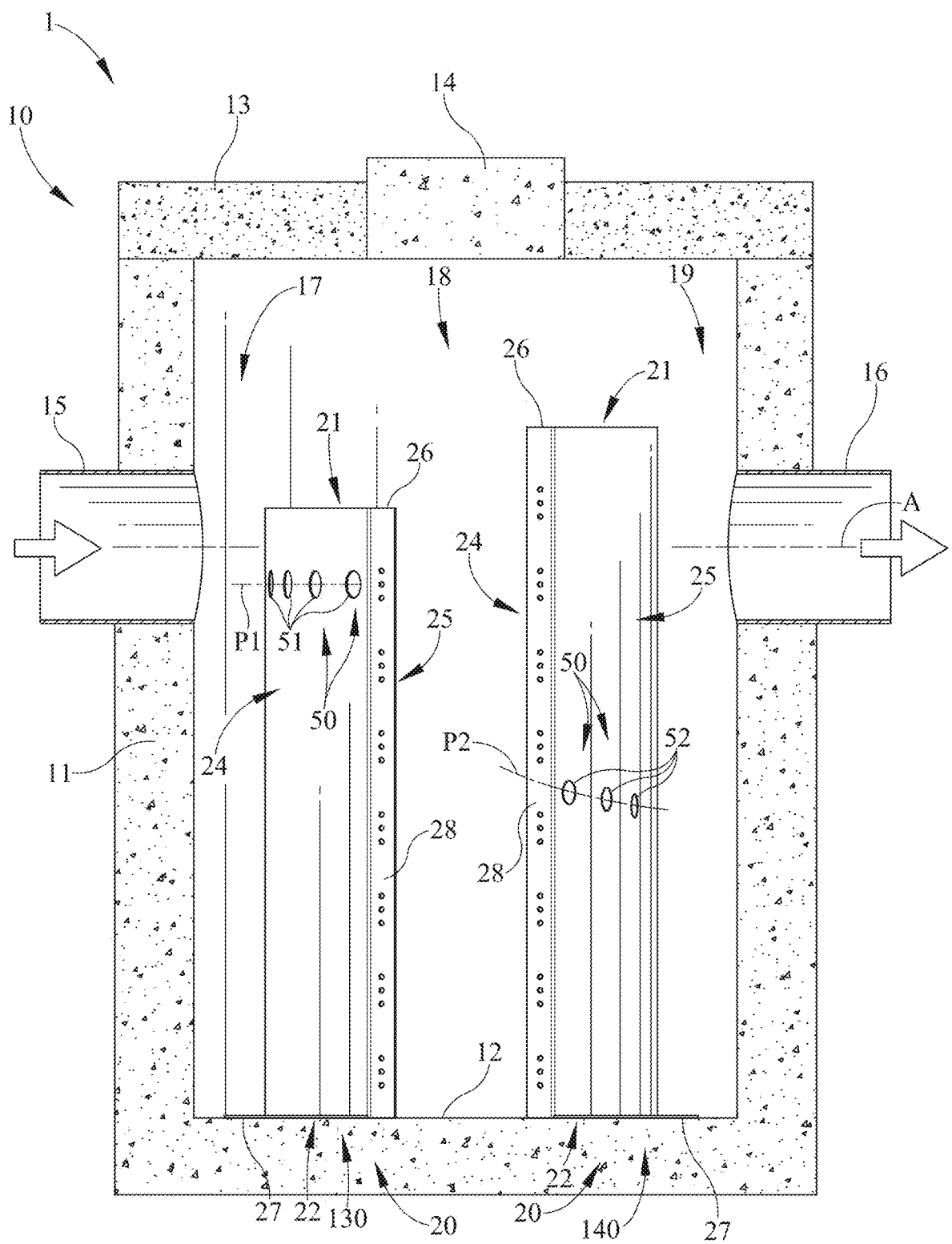
FIG. 8 is a side view of another embodiment of an upstream baffle and a downstream baffle within the sectional view of the manhole of FIG. 1.
Figure 9:
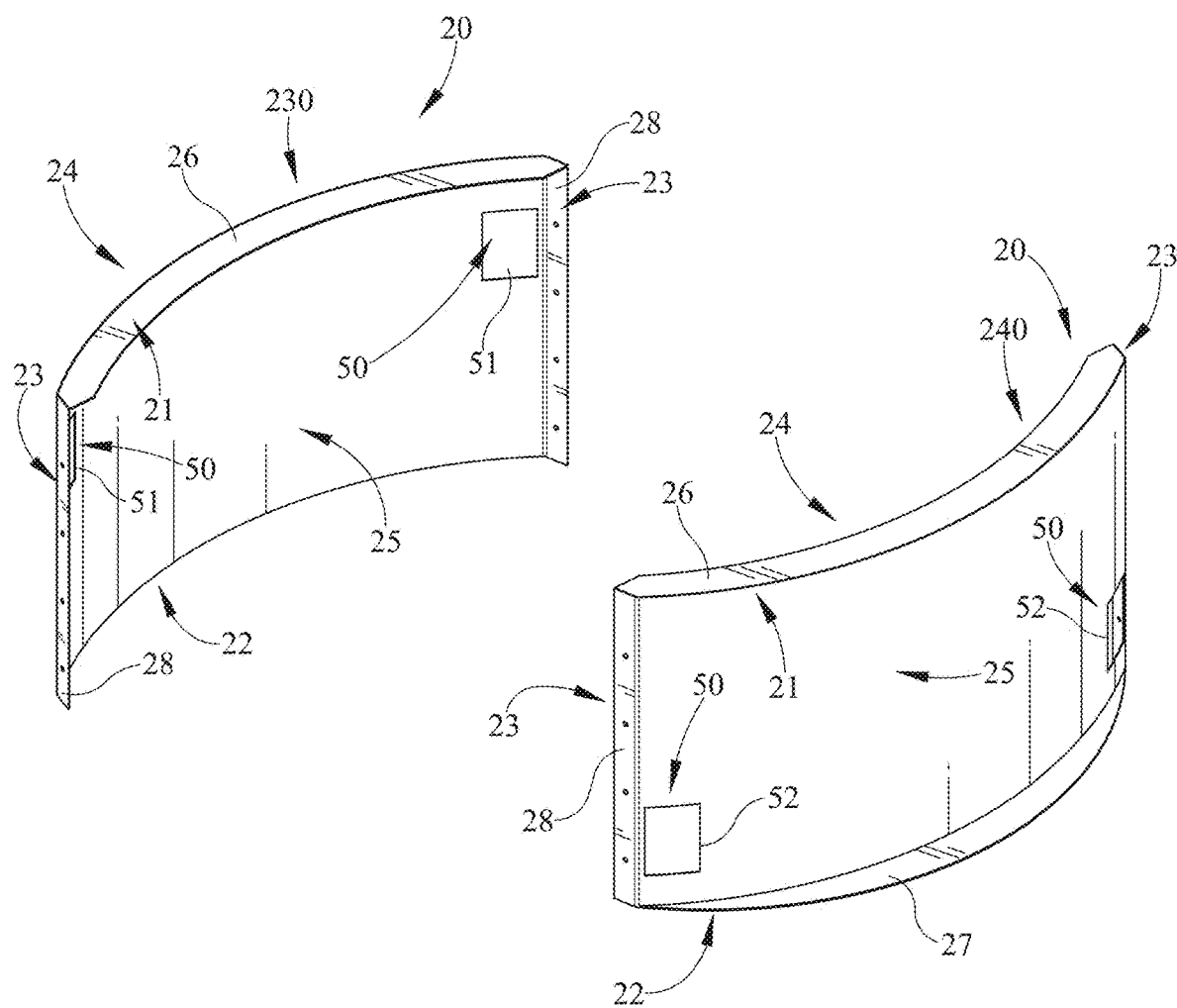
FIG. 9 is a perspective view of another embodiment of an upstream baffle and downstream baffle.
Figure 10:
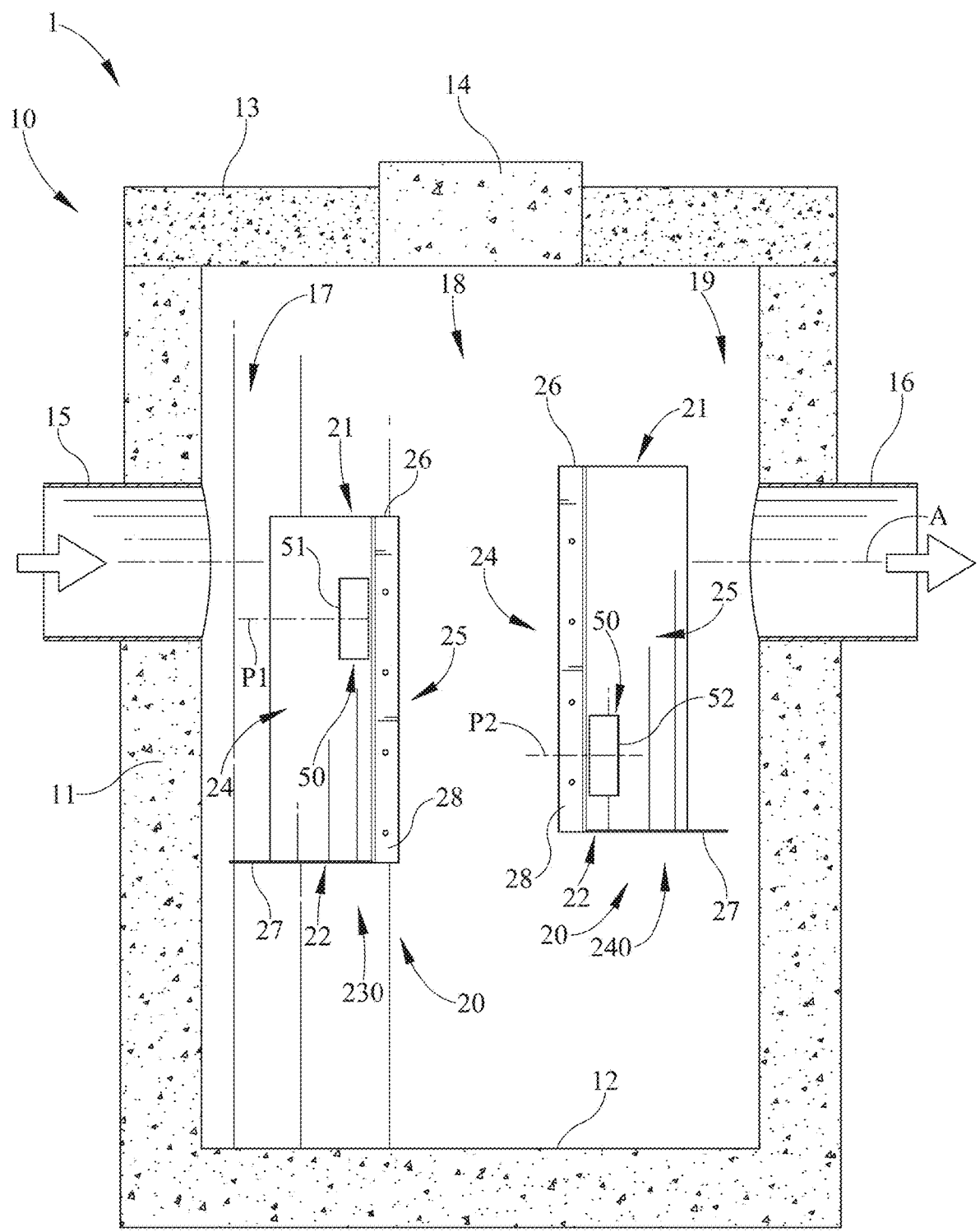
FIG. 10 is a side view of the embodiment of the upstream baffle and the downstream baffle of FIG. 9 illustrating their elevation within the sectional view of the manhole of FIG. 1.
Figure 11:
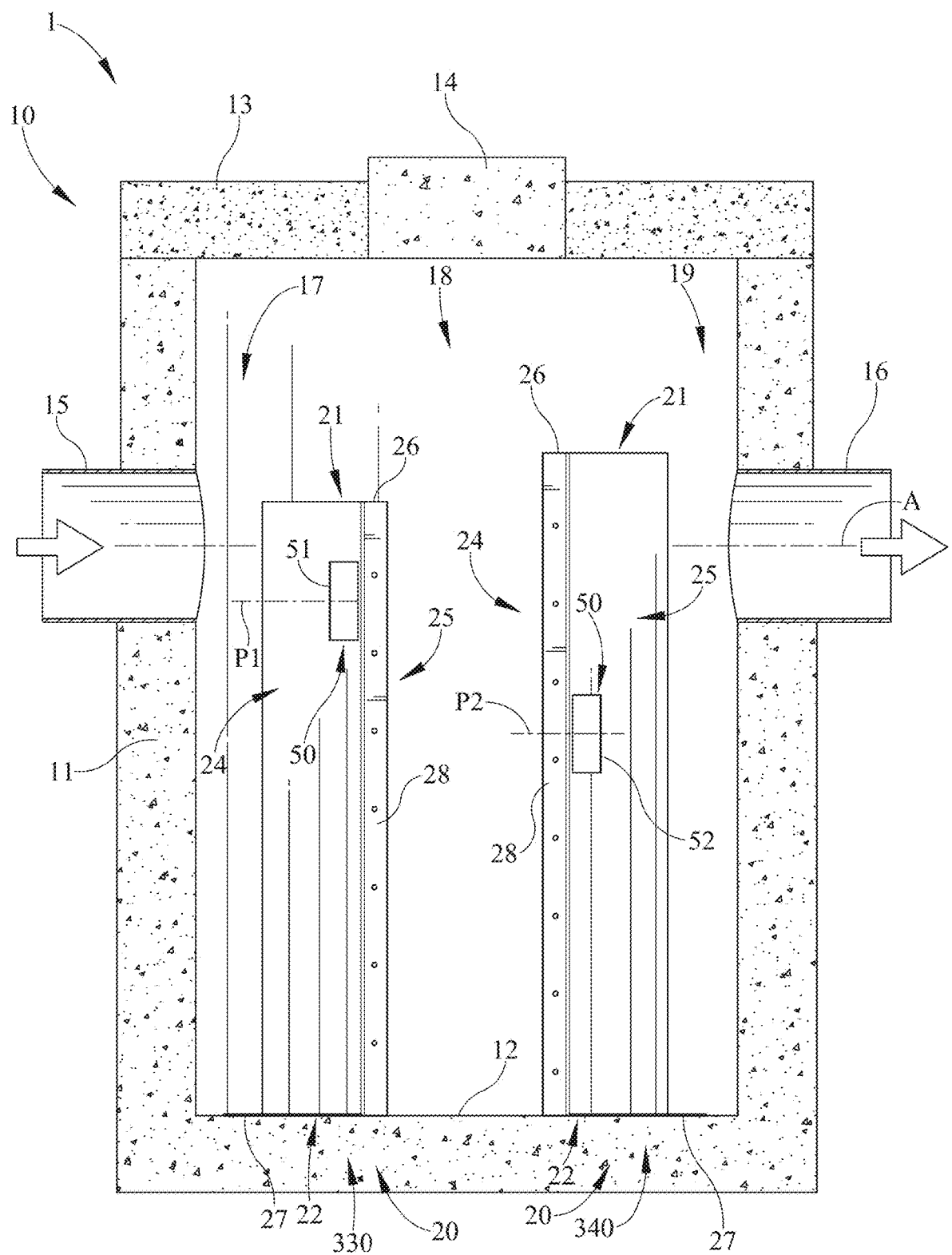
FIG. 11 is a side view of another embodiment of an upstream baffle and a downstream baffle within the sectional view of the manhole of FIG. 1.

In some implementations, one or more baffles 20 may be in a variety of positions within the manhole 10. In some embodiments, one or more baffles 20 (e.g. upstream and/or the downstream baffles) may extend from the bottom wall 12 of the manhole. The lower edge 22 of one or more baffles 20 may be adjacent the bottom wall 12 of the manhole 10. As shown in FIGS. 8, 11, and 12, both the upstream arcuate baffle 20, 130, 330 and the downstream arcuate baffle 20, 140, 340 may extend upwardly from the bottom wall 12 of the manhole 10. The lower edge 22 may be adjacent the bottom wall 12. In various implementations, one or more baffles 20 (e.g. upstream and/or the downstream baffles) may be spaced away from the bottom wall 12 of the manhole 10. The lower edge 22 of one or more baffles 20 may be spaced from the bottom wall 12 of the manhole. As shown in FIGS. 1-7, 9 and 10, both the upstream arcuate baffle 20, 30, 230 and the downstream arcuate baffle 20, 40, 240 may be spaced away from the bottom wall 12 of the manhole 10. The lower edge 22 may be spaced away from the bottom wall 12. It should be understood that one baffle (e.g. upstream or downstream), of one or more baffles, may extend from the bottom wall while another one or more baffles, if used, (e.g. upstream or downstream) may be spaced away from the bottom wall in some embodiments. In addition it should be understood that one baffle (e.g. upstream or downstream), of one or more baffles, may be spaced from the bottom wall while another one or more baffles, if used, (e.g. upstream or downstream) may extend from the bottom wall in various embodiments. For example, a single baffle may extend from the bottom wall. Alternatively, a single baffle may be spaced from the bottom wall. In some embodiments, for example, the upstream arcuate baffle may extend from the bottom wall while the downstream arcuate baffle may be spaced from the bottom wall. Alternatively, in some embodiments, for example, the upstream arcuate baffle may be spaced from the bottom wall while the downstream arcuate baffle may extend from the bottom wall.

In some implementations, one or more openings through one or more baffles 20 may be adjacent the side walls 23 and may be spaced apart therefrom. As shown in FIGS. 9-11, the one or more openings 50 may be adjacent the side walls 23. In some embodiments, the opening 50 may be adjacent both opposing side walls and may be spaced apart by a distance in one or more baffles. In some embodiments, the upstream arcuate baffle 230, 330 may include first openings 51 positioned away from each other adjacent the upper edge 21 and may be adjacent opposing side walls 23. The first openings 51 may be spaced apart a first distance in a direction between the opposing side walls 23. The first openings 51 may be at the same elevation in some embodiments as shown. But may be at different elevations in some embodiments. In various embodiments, the downstream arcuate baffle 240, 340 may include second openings 52 positioned away from each other adjacent the lower edge 22 and may be adjacent opposing side walls 23. The second openings 52 may be spaced apart a second distance in a direction between the opposing side walls 23. The second openings 52 may be at the same elevation in some embodiments as shown. But may be at different elevations in some embodiments. As shown in the embodiments in FIGS. 9-11, both the upstream and downstream arcuate baffles 20, 230, 330, 240, 340 may include the openings 50 positioned or spaced away from each other (e.g. adjacent the side walls). However, one or more baffles 20 (e.g. upstream or downstream) may include the openings 50 positioned or spaced away from each other (e.g. adjacent the side walls) in some implementations, alone or in combination with another one or more baffles with another or different opening pattern. Moreover, the plurality of openings 51, 52 are shown as rectangular in shape in the one embodiment shown in FIGS. 9-11, however, the openings may be a variety of shapes, sizes, and quantities.

In some implementations, varying the position of the one or more openings within the baffle may direct flow in one or more directions between cavities defined by the one or more baffles and/or between one or more inlets and one or more outlets. For example, in some implementations as more clearly shown in FIG. 12, the first openings 51 may spilt the flow from the first cavity 17/inlet 15 towards the second cavity 18. In addition, in various embodiments as shown in FIG. 12, the second openings 52 may converge flow from the second cavity 18 towards the middle cavity 19/outlet 16.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A drain system having a flow direction comprising:
   a manhole including at least one inlet and at least one outlet positioned downstream from the at least one inlet, and wherein the manhole includes a bottom wall;
   a first arcuate baffle having an upper edge and a lower edge and opposing side walls interconnecting the upper edge and the lower edge, and a convex side upstream of a concave side;
   a second arcuate baffle spaced downstream of the first arcuate baffle, wherein the second arcuate baffle includes an upper edge and a lower edge and opposing side walls interconnecting the upper edge and the lower edge, and a concave side upstream of a convex side; and
   wherein at least one of the first arcuate baffle and/or the second arcuate baffle includes one or more openings extending through both the concave side and the convex side, respectively.

2. The drain system of claim 1 wherein the first arcuate baffle and the second arcuate baffle each includes one or more openings, and wherein the one or more openings of the first arcuate baffle are positioned at a higher elevation than the one or more openings of the second arcuate baffle.

3. The drain system of claim 1 wherein the side walls of each one of the first arcuate baffle and the second arcuate baffle are attached to a side wall of the manhole.

4. The drain system of claim 1 wherein the lower edge of at least one of the first arcuate baffle and the second arcuate baffle are spaced away from a bottom wall of the manhole, and the upper edge of each of the first arcuate baffle and the second arcuate baffle are spaced from a top wall of the manhole.

5. The drain system of claim 4 wherein the lower edge of each one of the first arcuate baffle and the second arcuate baffle are spaced away from a bottom wall of the manhole.

6. The drain system of claim 1 wherein the lower edge of at least one of the first arcuate baffle and the second arcuate baffle are adjacent the bottom wall of the manhole, and the upper edge of each of the first arcuate baffle and the second arcuate baffle are spaced from a top wall of the manhole.

7. The drain system of claim 6 wherein the lower edge of each one of the first arcuate baffle and the second arcuate baffle are adjacent the bottom wall of the manhole.

8. The drain system of claim 1 wherein the one or more openings are positioned adjacent the opposing side walls of the at least one of the first arcuate baffle and/or the second arcuate baffle.

9. A drain system having a flow direction comprising:
   a manhole including at least one inlet and at least one outlet positioned downstream from the at least one inlet, and wherein the manhole includes a bottom wall and an opposing top wall;
   a first arcuate baffle having an upper edge and a lower edge and opposing side walls interconnecting the upper edge and the lower edge, and a convex side upstream of a concave side;
   a second arcuate baffle spaced downstream of the first arcuate baffle, wherein the second arcuate baffle includes an upper edge and a lower edge and opposing side walls interconnecting the upper edge and the lower edge, and a concave side upstream of a convex side; and
   wherein the upper edge of at least one of the first arcuate baffle and/or the second arcuate baffle is spaced from the top wall of the manhole.

10. The drain system of claim 9 wherein the lower edge of at least one of the first arcuate baffle and/or the second arcuate baffle is adjacent the bottom wall of the manhole.

11. The drain system of claim 9 wherein the lower edge of at least one of the first arcuate baffle and/or the second arcuate baffle is spaced away from the bottom wall of the manhole.

12. The drain system of claim 9 wherein the first arcuate baffle includes one or more first openings and the second arcuate baffle includes one or more second openings.

13. The drain system of claim 12 wherein a plurality of the one or more first openings of the first arcuate baffle are positioned in a linear pattern substantially parallel to the upper edge.

14. The drain system of claim 12 wherein a plurality of the one or more second openings of the second arcuate baffle are positioned in a linear pattern substantially parallel to the upper edge.

15. The drain system of claim 12 wherein at least one of the one or more first openings is at a higher elevation than at least one of the one or more second openings.

16. The drain system of claim 9 wherein at least one of the first arcuate baffle and/or the second arcuate baffle includes at least one opening extending through both the concave side and the convex side, respectively.

17. A drain system having a flow direction comprising:
   a first arcuate baffle having a concave side, wherein the first arcuate baffle includes one or more first openings;
   a second arcuate baffle spaced downstream of the first arcuate baffle, wherein the second arcuate baffle includes a concave side, and wherein the second arcuate baffle includes one or more second openings; and
   wherein the concave sides of each of the first arcuate baffle and the second arcuate baffle face towards each other to define at least one cavity therebetween.

18. The drain system of claim 17 wherein the one or more first openings of the first arcuate baffle are substantially in a first horizontal plane and the one or more second openings of the second arcuate baffle are substantially in a second horizontal plane, and wherein the first horizontal plane is at a higher elevation than the second horizontal plane.

19. The drain system of claim 17 wherein each one of the first arcuate baffle and the second arcuate baffle includes an upper edge and a lower edge, and opposing side walls interconnecting the upper edge and the lower edge.

20. The drain system of claim 17 further comprising a manhole including at least one inlet and at least one outlet positioned downstream from the at least one inlet, wherein the first arcuate baffle and the second arcuate baffle is positioned between the at least one inlet and the at least one outlet.

21. The drain system of claim 17 wherein a lower edge of at least one of the first arcuate baffle and/or the second arcuate baffle is adjacent a bottom end of a manhole.

22. The drain system of claim 17 wherein a lower edge of at least one of the first arcuate baffle and/or the second arcuate baffle is spaced away from a bottom end of a manhole.

23. The drain system of claim 17 wherein an upper edge of at least one of the first arcuate baffle and/or the second arcuate baffle is spaced away from a top end of a manhole.

* * * * *